(12) United States Patent
Notanii et al.

(10) Patent No.: US 6,801,776 B2
(45) Date of Patent: Oct. 5, 2004

(54) SYSTEMS AND METHODS FOR DIMENSIONING A WIRELESS COMMUNICATION SYSTEM

(75) Inventors: Rajesh Notanii, San Diego, CA (US); Paul Sarraffe, Carlsbad, CA (US)

(73) Assignee: Telefonaktiebolaget LM Ericsson (Publ) (SE)

( * ) Notice: Subject to any disclaimer, the term of this patent is extended or adjusted under 35 U.S.C. 154(b) by 628 days.

(21) Appl. No.: 09/825,133

(22) Filed: Apr. 2, 2001

(65) Prior Publication Data

US 2003/0054843 A1 Mar. 20, 2003

Related U.S. Application Data

(60) Provisional application No. 60/236,927, filed on Sep. 28, 2000.

(51) Int. Cl.$^7$ .................................................. H04Q 7/20
(52) U.S. Cl. ...................... 455/451; 455/452; 455/509; 370/252
(58) Field of Search .............................. 455/67.11, 450, 455/451, 452, 453, 509; 370/252, 328

(56) References Cited

FOREIGN PATENT DOCUMENTS

WO   WO 00/30385   5/2000

OTHER PUBLICATIONS

Christian Hoymann and Peter Stuckmann, "Traffic Engineering for the Evolution of GPRS/EDGE Networks", 2002 IEEE 56th, vol: 2 , Sep. 24–28, 2002 Pages:1279–1283 vol. 2.*

C.N. Konstantinopoulou, "Core Network Planning, Optimization and Forecasting in GSM/GPRS Networks", 2000 IEEE, SCVT–200. Symposium on , Oct. 19, 2000 Pages:55–61.*

Ming Tan et al., "Wireless Usage Analysis for Capacity Planning and Beyond: A Data Warehouse Approach," Applied Power Electronics Conference and Exposition (APEC)., 2000 IEEE, pp. 905–918.

Bae Y–H et al., "Capacity Planning for IMT–2000 Using Long Range Dependent Traffic," 1999 IEEE, VTC '99, pp. 909–913.

Laiho–Steffens J. et al., "The Impact of the Subscriber Profile on WCDMA Radio Network Performance," 1999 IEEE, VTC :99, pp. 2490–2494.

Baier et al., "Traffic Engineering and Realistic Network Capacity in Cellular Radio Networks with Inhomogeneous Traffic Distribution," 1997 IEEE, pp. 780–784.

* cited by examiner

*Primary Examiner*—Lee Nguyen
*Assistant Examiner*—Un C Cho
(74) *Attorney, Agent, or Firm*—Coats & Bennett, P.L.L.C.

(57) ABSTRACT

A method of dimensioning a wireless communication system configured to support a plurality of applications. The method includes, for each application, estimating a percentage of subscribers of the wireless communication system that will use the application. Then a subscriber profile is determined for the application based at least in part on the estimated percentage of subscribers that will use the application. Then a busy hour traffic per subscriber ratio is determined for the application based at least in part on the subscriber profile for the application.

22 Claims, 2 Drawing Sheets

SYSTEMS AND METHODS FOR DIMENSIONING A WIRELESS COMMUNICATION SYSTEM

CROSS REFERENCE TO RELATED APPLICATIONS

This application claims the benefit of priority under 35 U.S.C. §119 to U.S. Provisional Application Ser. No. 60/236,927, filed Sep. 28, 2000, which is fully incorporated herein by reference.

BACKGROUND OF THE INVENTION

1. Field of the Invention

The invention relates generally to wireless communications, and more particularly to a systems and methods for dimensioning a wireless communication system.

2. Background

In wireless communication systems, radio system engineers must be able to determine the number of base stations required to support a given number of users in a given area. This process, for purposes of this specification and the claims that follow, is referred to as dimensioning the wireless communication system. In a pure circuit switched system, this is not a problem; however, when packet data is incorporated, it becomes difficult to determine the number of base stations required. This is because packet data capability allows a complex mix of subscriber applications such as web access, e-mail, and multimedia applications. These applications greatly increase the number of variables that effect capacity in wireless communication systems. For example, new variables include burstiness of packets, packet size, delay constraints, and delay variations. Unfortunately, the traditional packet data statistics used to track these variables do not correlate with the statistics used to track variables that effect circuit-switched applications.

In particular, the Erlang model traditionally used to measure capacity for voice-centric systems is not applicable to packet data applications. Simplistically, the Erlang model uses the average number of incoming calls per second, the average length of a call in seconds, and the number of lines available to take the calls. If these three variables are known, Erlang's formula can be applied to determine the percentage of incoming calls for which no line will be available, i.e., the percentage of calls that will be blocked or delayed.

Erlang's equation has the form:

$$E(t, c) = \frac{t^c}{c!} \left[ \sum_{i=0}^{c} \frac{t^i}{i!} \right]^{-1} \quad (1)$$

where t=the number of incoming calls;
and c=the number of lines.

The traffic (t) is often expressed in the dimensionless unit "Erlang." Traffic in Erlang is a number that signifies the expected number of lines, or circuits, that would be occupied if there were no blocking. It is found by multiplying the total expected number of calls per time unit, i.e., average incoming calls per second, with the average length per call. The left hand side of equation (1) provides the proportion of calls that are blocked. Therefore, if (t) and (c) were known, the number of blocked calls can be determined.

In actuality, modern systems require a much more complex model than provided by equation (1), but the basic principle is still the same. therefore, radio systems engineers look at the traffic (t), number of circuit (c) available, and the number of blocked calls deemed acceptable, when planning how many base stations are required and where to position them. Because of the complexity of the systems, the traffic (t) is determined based on complex traffic models that account for issues such as the radio resource management scheme and the effect of user mobility on the traffic volume per call. The number of blocked calls is referred to as the grade-of-service (GOS). By specifying the GOS and determining the traffic (t) in accordance with the appropriate traffic model, the radio systems engineer can determine the number of circuits (c) required. GOS is typically applied to the busy hour, which is a sliding 60-minute period during which the maximum total traffic load in a given 24-hour period occurs. Packet data applications, however, do not use GOS. Instead, packet data applications are characterized by quality-of-service (QOS), which is measured by bit-error-ratio (BER). Thus, packet data applications look at the number of bit errors as opposed to the number of blocked calls. Traditional models do not provide a method for equating GOS requirements in circuit switched applications with QOS requirements in packet data applications.

SUMMARY OF THE INVENTION

In accordance with an aspect of the invention, systems and methods for dimensioning a wireless communication system that supports both circuit switched and packet data applications are provided as a way to equate GOS and QOS requirements. One feature of this aspect is that engineers may better determine an optimal number of base stations required to support a given number of users in a given service area of the wireless communication system.

In one embodiment, a method of dimensioning a wireless communication system configured to support a plurality of applications is provided, in which, for each application, a percentage of subscribers of the wireless communication system that will use the application is estimated. A subscriber profile for the application is then determined based at least in part on the estimated percentage of subscribers that will use the application. A busy hour traffic per subscriber ratio is then determined for the application based at least in part on the subscriber profile for the application.

The method may further comprise determining a total busy hour traffic per subscriber ratio for the wireless communication system from the busy hour traffic per subscriber ratios for each application. A total traffic capacity is then estimated for the wireless communication system. The number of subscribers the wireless communication system will support is then calculated by dividing the estimated total traffic capacity by the total busy hour traffic per subscriber ratio.

Other aspects, advantages and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1:
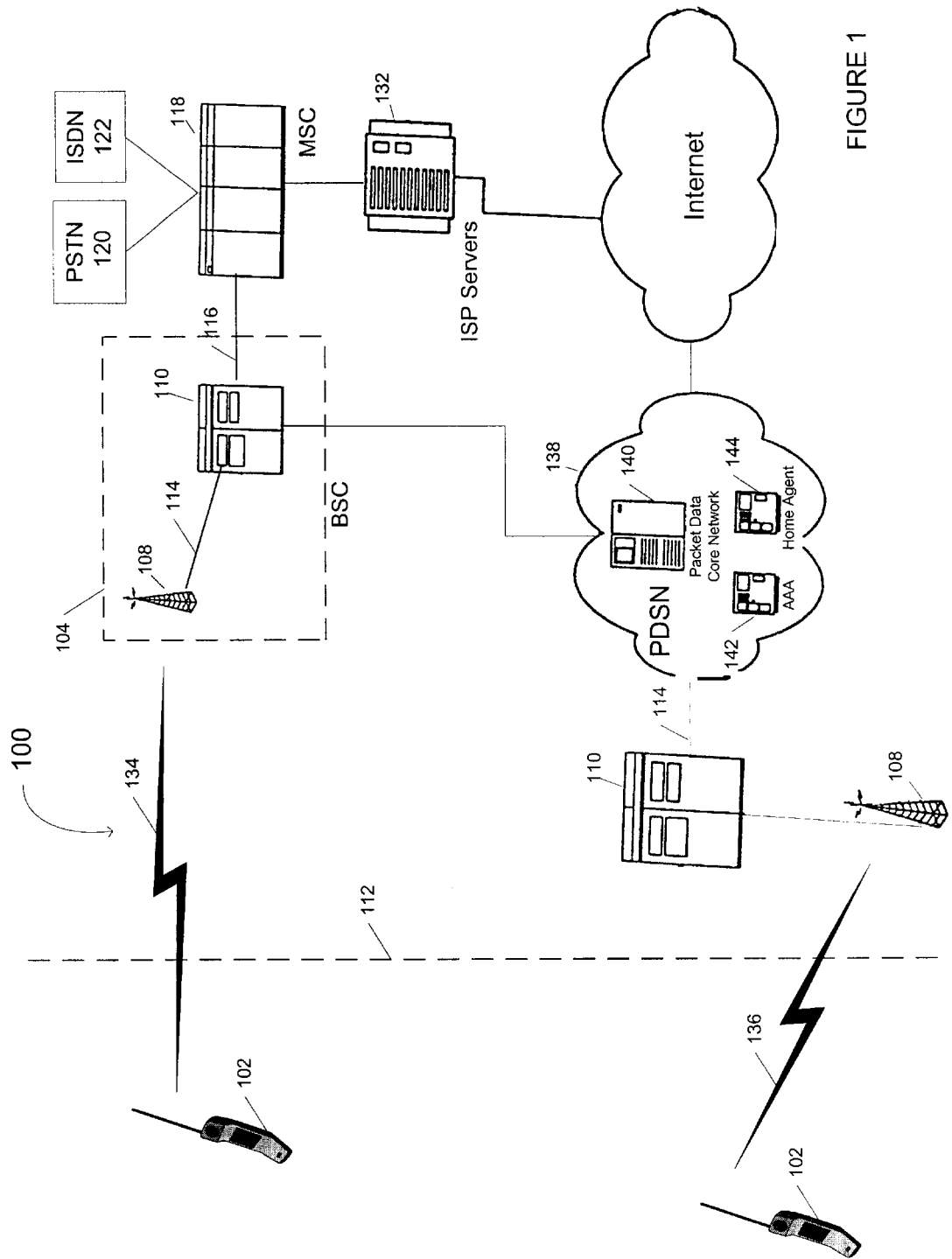
FIG. 1 is a block diagram that illustrates an exemplary wireless communication system.

The architecture of a wireless communication system 100 is illustrated in FIG. 1. In a wireless telecommunications system, a coverage area is divided into a plurality of cells. System 100 is divided into three interconnected components or subsystems: A plurality of mobile devices, an example of which is designated as mobile device 102, a Base Station Subsystem (BSS) 104, and a Mobile Switching Center (MSC) 118. Generally, the mobile device 102 is the mobile equipment carried by a subscriber to system 100. Traditionally, mobile devices used in wireless communication systems 100 have been voice centric devices, such as cellular phones. More recently, however, data centric devices such as laptops and PDAs are commonly designed for mobile applications. Moreover, even today's cellular phones are typically configured for data applications.

BSS 104 is comprised of multiple base transceiver stations (BTS), an example of which is designated BTS 108, and a base station controller (BSC) 110. The BTS 108 is usually in the center of a cell and consists of one or more transmitters with antenna. A cell is the coverage area of a particular BTS 108. Low power transmitters are utilized so that frequencies used in one cell can be used in cells that are sufficiently distant to avoid interference. BTS 108 establishes radio links and handles radio communications over an air interface 112 with mobile devices 102. Each BSC 110 manages a plurality of BTSs 108. This involves allocating and managing radio "channels" and controlling "handoffs" of communications involving mobile devices 102 from one BTS 108 to another. BTS 108 and BSC 110 communicate over a standardized "Abis" interface 114, and in turn BSC 110 communicates with MSC 118 over a standardized interface 116. For example, interface 116 can use a standardized base station application part (BSAP) protocol or a standardized SS7 protocol. MSC 118 manages communications between mobile devices 102 and between mobile devices 102 and public networks. Examples of public networks that MSC 118 can interface to include the Integrated Services Digital Network (ISDN) 120 and the Public Switched Telephone Network (PSTN) 122.

System 100 can often support a variety of data services. For example, MSC 118 can interface mobile devices 102 to the Internet through an ISP 132. MSC 118 can be interfaced to an ISP 130 through PSTN 120 or ISDN 122, but the Internet uses packet data communication, which is non-real time communication. Because non-real time communication is unacceptable for voice communications, system 100 uses a circuit switched carrier 134 to carry communications to and from the mobile devices 102. Therefore, a Packet-Assembler-Disassembler (PAD) (not shown) is also included when interfacing MSC 118 to the Internet. The PAD converts circuit switched communications from mobile devices 102 to packet data communications and vis versa.

As mobile data applications have proliferated, however, a need for faster data service for mobile devices 102 has developed. Like the Internet, mobile data services can use non-real time communication. Therefore, wireless communication systems, like system 100, typically include packet data carriers 136 for communicating packet data between mobile devices 102 and the Internet. Typically, mobile packet data is not controlled by MSC 118. Instead, Packet Data Service Network (PDSN) 138 handles communications between mobiles 102 and the Internet over packet data carriers 136. PDSN 138 includes packet data core network 140, Authorization, Authentication, and Account node (AAA) 142, and the home agent 144. Packet data core network 140 handles the routing of traffic between mobile device 102 and the Internet. Home agent 144 is a router on a mobile device's home network which sends packets to the mobile device while it is away from its home network. It also keeps current location information for registered mobile devices called a mobility binding. AAA 142 is a server that stores information related to services and authentication for mobiles 102. The AAA server can also supply security parameters.

Different data services, whether circuit switched or packet switched, will require different GOS or QOS, respectively. The Internet today provides a service that has been called "best effort." When one sends a packet, the network forwards it as best it can given the other traffic offered at the moment, but makes no specific guarantee as to the rate of delivery or that the packet will be delivered at all. Many computer applications operate very naturally in a context that does not guarantee-bandwidth, and best-effort service has been demonstrated to be effective for the. Best-effort service divides up the available bandwidth among current users. Having an application sometimes run a bit more slowly does not usually cause serious user dissatisfaction. For applications such as remote file access, in fact, best-effort service has proved very effective. Of course, best-effort service is tolerable only within limits, and a network that is totally congested will not be acceptable.

An alternative to best-effort service is one that requires the traffic source to declare its service requirements, so that the network can either reserve and guarantee this service or explicitly refuse the request. When there is excess bandwidth, both best-effort and reserved bandwidth service work well to make users happy. But when there is congestion, the choice is between slowing all users down somewhat, as is the case with best-effort service, or refusing some users outright in order to fully serve others with reserved bandwidth. For some applications, such as real-time audio and video, a reserved service may be preferable. As a result, system 100 can offer a variety of data applications over a variety of bearer services. This sort of variation in the bearer service is described by the QOS, which is understood in the technical community as covering control of delay, bandwidth, degree of guarantee versus degree of sharing, loss rates, and so on.

The Internet and mobile data packet applications are moving from single, best-effort service to a more complex model with explicit options for QOS, to support new applications such as video and audio. On the circuit switched side, different bearers are specified in terms of GOS. For example, one traffic model for a CDMA2000 wireless communication system uses two bearer services options for circuit switched voice applications. The first service option, rate set 1, operates from 9.6 Kbps to 1.2 Kbps. The second service option, Rate set 2, operates from 14.4 Kbps to 1.2 Kbps. The CDMA2000 standard allows for Circuit Data Service options at Rate Set 1 (9.6 kbps), Rate Set 2 (14.4 kbps), and a new service option at 64 kbps. To use the new service option effectively, ISDN service is required end-to-end. For packet data applications, CDMA2000 Phase 1 will provide for a maximum Packet Switched service rate of 144 kbps.

From a subscriber (end-user) and source application perspective, four major classes have been identified which better characterize packet switched data traffic patterns: interactive, background, conversational, and streaming. In order to maintain a QoS that meats the interactive class requirement, the end-user requirement is that the requestresponse sequence be preserved as well as payload content. The interactive class can also be classified as non-real-time. A good example would be traditional Web applications or email. In the background class, the only end-user QoS requirement is that the payload content be preserved. No expectations are placed on the delay or the variation of delay. The background class can also be classified as non-real-time. Background services can include data that is pushed or pulled to or from the terminal when the user is attached to the network, but not necessarily active. Examples are Stock Market information, Sport News, email, Fax, etc. Other examples could be DNS traffic, other mobile information services that are both commercial and society related, and software download of terminal properties. These services should be low cost and make use of spare bandwidth. Traffic in the interactive class has higher priority in scheduling than background class traffic, so background applications use transmission resources only when interactive applications do not need them. Note that some of the mail traffic defined in the interactive class could also be considered part of the background class. Interactive class and background class are mainly intended for traditional Internet applications like Web applications, email, Telnet, FTP, and News. In both classes the resources are reserved dynamically and the responsiveness of the interactive applications is ensured by the separation of interactive and backgrounds applications.

In the conversational class, the fundamental QoS characteristic is to preserve the time relation (variation) between the source information and final destination of the information stream with low bi-directional time delay. This class is the most time delay sensitive and therefore time delay must be maintained even at the expense of payload content if necessary. Conversational class can also be classified as real-time. The intended application for this class is speech. In the streaming class, the fundamental QoS characteristic is to preserve time relation between the source information and final destination of the information stream. Because the streaming class traffic is not so delay sensitive (however, it is sensitive to delay variation) as that of conversational class, it may allow for a better error rate than conversational class. The streaming class can also be classified as real-time. A good example of this class would be video/audio streaming from a Web site. Conversational and streaming classes are intended to carry real-time traffic flows like speech and video streaming. Whereas, the interactive and background classes are characteristic of traditional Internet applications like Web applications and email, and for a number of vertical applications like Telemetry and Point of Sale. The following characteristics are of interest for real time applications: 1) Duration of one session (ie. 'call)'), 2) Byte volume up and down per session, 3)Packet size up and down, 4) Number of sessions (i.e. 'calls') per day, and 5) Distribution of sessions (i.e. 'calls') during the day.

A major challenge in dimensioning a wireless communication system that embodies packet data and circuit switched applications is that of determining the sector capacity in a complex mix of subscriber applications such as voice, web access, email, multimedia, etc. In such systems, the number of variables that affect sector capacity such as burstiness of packets, packet size, delay constraints, delay variations, etc., is very high. A Dimension Tool that uses a multi-step process, using look up tables, spreadsheets, and propagation models can be used to overcome these issues. The methods used by such a tool will now be discussed. In developing the tool, engineering simplification are made with regard to call model variables and their impact on the throughput of data.

The traditional approach of expressing capacity, as an Erlang number, is not quite applicable here due to packet switched applications, hence the traffic is expressed in terms of bits carried in the busy hour (in forward and reverse links),and the capacity is expressed in terms of bits per second.

Figure 2:
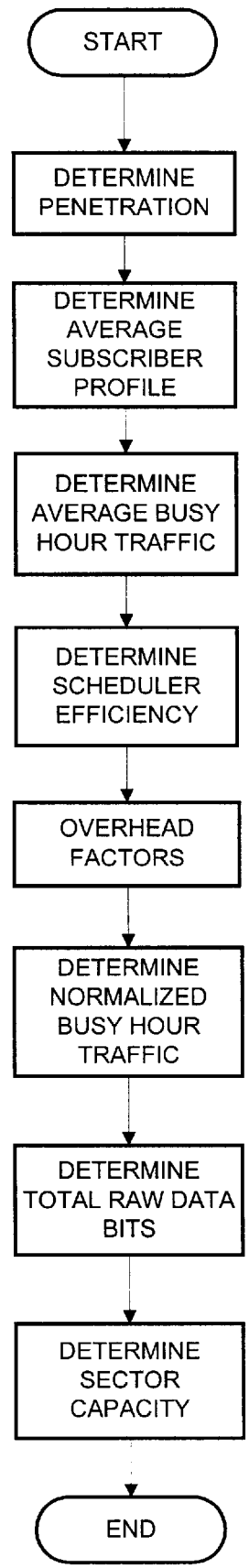
FIG. 2 is a flow chart that illustrates a method for determining the capacity of a wireless communication system, such as the system illustrated in FIG. 1.

FIG. 2 is a flow chart that illustrates the multi-step process used by the tool. Table 1, at the end of this description, illustrates some sample results from applying the multi-step process to a hypothetical system. And column A of table 1 lists the available bearer services and applications. In step 202, the subscriber penetration for each application must be determined and, using the penetrations, the percentage of total subscribers using a particular application at any given time is found. In order to make this determination, the percent of the total subscribers that subscribe to a bearer service associated with a given application is multiplied by the percent of subscribers that actually use the application. The product is then multiplied by a usage scaling factor that is intended to approximate what percent of the time a typical subscriber will actually use the application. This calculation can be illustrated using the first application in table 1, which is a Web application, with images, over a packet data bearer service. Column B shows what percent of subscribers subscribe to the applicable bearer service, in this case the packet data bearer service. Column C shows the percentage of subscribers that subscribe to the Web application. And column F shows what percent of the time these subscribers are actually using the service. Thus, step 202 consist of multiplying the values stored in columns B, C, and F, and storing the result in column H. The result of the calculation for the Web application being considered is: $0.80 \times 0.20 \times 0.50 = 0.08$ or 8%.

Next, in step 204, an average subscriber profile is determined. This determination involves estimating the number of application sessions per day engaged in by a typical subscriber for each application (column D) and multiplying the estimate by the average time for each session in seconds (column E). This product is then divided by 3600, the number of seconds in an hour, to generate a busy hour factor (column G). Continuing the analysis for the web application used to illustrate step 202, the result of this calculation is: $(3 \times 250)/3600 = 0.20$ or 20%. The busy hour factor is then multiplied by the percent of subscribers using a particular application at any given time, i.e., the value in column H, and the number of sessions for each of these users, i.e., the value stored in column D, with the result being stored in column I. The result of this calculation is: $0.20 \times 0.08 \times 3 = 0.048$.

In other words, the result stored in column I represents the busy hour calls/sessions per subscriber averaged over the total subscribers in the wireless communication system. Since this calculation is performed for each application, i.e., for each application listed in column A of table 1, this calculation provides the average usage behavior of a subscriber for each application, or the average subscriber profile in the busy hour. The profiles can then be used to calculate the total busy hour data bit requirement for each subscriber, which is denoted the "Raw Data Bits." The Raw Data Bits is the common measurement criteria for both packet data and circuit switched applications. Once the Raw Data Bits are determined for each application, they can be added in a purely arithmetic fashion to clearly describe the traffic per user across all applications in the system. The process and importance of finding and using the Raw Data Bits for each application will be clearly illustrated in the discussion below.

In step 206, the average busy hour traffic in kilobytes per busy hour per user (KB/BH/user) are calculated. First, however, the total kilobytes per application is found by multiplying the number of packet calls per session (column J) by the number of datagrams per call (columns K and L) and the number of bytes per datagram (columns M and N). This is carried out for both the forward and reverse link. Second, the total kilobytes per application is multiplied by the average subscriber profile form step 204, with the results being stored in columns O and P. It should be noted that for circuit switched applications, the number of data grams per call and the number of bytes per data gram do not apply; therefore, these columns are blank for circuit switched applications in table 1. For the current example, the average busy hour traffic per subscriber is:

(10×60×650)×0.048=18.72 KB/BH/user          (forward link);

(10×30×65)×0.048=0.936 KB/BH/user          (reverse link).

It should be noted that the actual values that appear in table 1 may be slightly different than the values calculated here, because of differences in rounding the various results and sub-results. Additionally, the calculation performed in step 206 can also account for various overhead bits. For example, if the wireless communication system is a CDMA2000™ system, then step 206 can account for overhead bits included in the CDMA2000™ model.

Because table 1 contains data for a CDMA2000™ system, the actual values contained in columns O and P are different than the above calculation would predict. Fundamentally, however, the values for columns O and P are arrived at via the above calculation.

Certain embodiments of system 100 do not implement a multi-user scheduler supporting traffic classes with different QoS requirements. Instead, these embodiments use a single user scheduler based on the best effort-principle, where a delay constraint of 5 seconds is typically considered a reasonable bound. Therefore, current embodiments consider all packet data application as an interactive class of traffic and circuit switched applications as conversational class. Interactive class is mainly used by applications like web browsing and has following service session characteristics:

(1) Duration of one session;

(2) Number of requests in a session;

(3) Byte volume up and down per session;

(4) Packet size up and down;

(5) File size down;

(6) Inter request times;

(7) Number of sessions per day;

(8) User access (rate, QoS) (e.g. best effort with max rate); and (9) Distribution of sessions during the day.

The values stored in columns D, G, J, K, L, M, and N of table 1 describe such behavior. Thus almost all the data up to now is input data that currently has UMPS default values. Columns O and P start the analysis of determining busy hour traffic per subscriber. This is done for each application and column O and P store the Kbytes per subscriber in the busy hour for forward and reverse link. The sum total of this traffic is actually the payload that is transacted during the busy hour for each application. It is an average per subscriber considering the whole population in the system. The subsequent analysis attaches various overheads on this payload and attempts to figure out the Raw Data Bits on the air link in both directions.

One such overhead is the scheduler efficiency factor, which is found for both packet data and circuit switched applications in step 208. For packet data applications, the scheduler efficiency at different data rates is a factor of burstyness of the data, i.e., its duty cycle, and such characteristics as packet size. Simulations for the forward link throughput in an ISO-2000-A (CDMA2000) system are provided in Vieri Vanghi, IS-2000A Forward Link Throughput (Vanghi), EWU/TT/R-00:002, which is incorporated herein by reference in its entirety, and which is used to provide some of the details for the following scheduler efficiency calculations. The scheduler efficiency is stored in columns S and T, for the forward and reverse links respectively. Using the efficiency figure (columns S and T) and the traffic in columns O and P for each user, the Raw Data Bits corresponding to 100% scheduler efficiency are determined for each application. Keep in mind that 100% scheduler efficiency is an ideal number which is possible only in cases where there are no constraints in the system such as delay constraint, delay variation, etc.

Table 2 illustrates an example calculation of a scheduler efficiency for a packet data application. The scheduler efficiency in table 2 is associated with activity factor or the duty cycle of the packet call models. It is assume that the efficiency factor is linearly related to the activity factor. It is further assumed that in general this approach applies to any call model, and the assumed delay constraint of 5 seconds is considered the minimum performance bound in a best effort implementation. Therefore, if the activity factor for at least two data rates is known, then a linear equation can be developed to find the scheduler efficiency factor for any data rate.

TABLE 2

| Data Rate | Activity factor | Scheduler Efficiency |
|---|---|---|
| 38.4 kbps | $A_1 = 0.089$ | $N_1 = 0.68$ |
| 9.6 kbps | $A_2 = 0.385$ | $N_2 = 0.74$ |

The table 2 scheduler efficiency call model is taken from Vanghi so that the average packet size is 4.1 Kbytes, the packet inter-arrival time is 10 sec, and the session duration is 10 packets, with a maximum delay of 5 seconds. Because a linear relation between the scheduler efficiency and the channel activity factor for a user is assumed, a linear equation can be applied to the data points above to find the slope and the intercept for the relationship. The following equation is used to find the slope:

$$\text{Slope } M = (N_2 - N_1)/(A_2 - A_1);$$
$$= (0.74 - 0.68)/(0.385 - 0.089);$$
$$= 0.2027.$$

To find the intercept we apply $(N-N_1)=M\times(A-A_1)$, where we substitute A=0; Thus, intercept C=N=0.68−0.2027 (0.089)=0.662, and the scheduler efficiency N at an activity factor A is now given by:

$$N=M\times A+C; \text{ or}$$
$$N=0.2027\times A+0.662. \qquad (2)$$

This formula is a simplification and is justified by the following logic: If the user peak data rate is constant and the activity factor is reduced, the scheduler has to accommodate more users in the system in order to fully exploit the available bandwidth. More users instinctively implies that the scheduler efficiency goes down and under the model illustrated by equation (2), as the channel activity factor goes down the scheduler efficiency does indeed go down. Similar logic applies to the opposite case of a higher channel activity factor. If the user peak data rate is increased and a constant activity factor is maintained, then the number of users in the system will have to be reduced in order to accommodate the increased average data rate per user. So while the increased data rate could have signaled a reduction in scheduler efficiency, the lesser number of users would imply the reverse, and overall the scheduler efficiency will stay the same. In this case, the channel activity factor will decide the scheduler efficiency. Under these conditions both of these values stay the same. On the other hand, if the user data rate increase is accompanied by a proportionate decrease in the activity factor then the scheduler efficiency goes down as well which is also indicated by the model illustrated in equation (2).

Therefore, Equation (2) is used to calculate the scheduler efficiency for any call model in table 1. Continuing with the above example, the scheduler efficiency factor for the Web application can be determined using the equation N=0.2027×A+0.662, where A is replaced by the value stored in column O or P divided by the data rate from column Q or R, respectively, depending on whether the calculation is for the forward or reverse channel. For the Web application then, the calculation is:

0.2027×(19.2/38.4)+0.662=0.76335 (forward link)

0.2027×(1.416/38.4)+0.662=0.66948 (reverse link)

In step 208, circuit switched applications are treated slightly different. The goal is to characterize the circuit switched application so as to arrive at the same Raw Data Bits figure as computed for packet data applications. This will allow the two to be merged to find the total circuit switched and packet switched traffic bits. Voice and other circuit switched applications like fax are real time; therefore, they have stringent delay constraints as well as stringent delay variation constraints. Hence, it is clear that they should have relatively lower efficiency factors. The traditional concept of Grade of Service (or blocking probability) is now translated into an in-efficiency factor that is equivalent to the scheduler efficiency factor in packet switched applications. Considering an Erlang B model and a 2% GOS, 36 trunks give an Erlang capacity of only 28 Erlangs. This effectively means an efficiency factor of approximately 28/36=78%.

Note that this is a new traffic engineering approach and has been created to merge the packet data and circuit switched applications into one measurement. The Erlang B model efficiency factor is equated to a scheduler efficiency factor in voice application. Since the $E_b/I_o$ requirement, which is a metric used to indicate the signal-to-noise ratio for a particular signal, for voice is greater than that for packet data by about 1.3 dB, the scheduler efficiency calculation includes another efficiency factor for circuit switched applications corresponding to $10^{\wedge}(-1.3/10)=74\%$. These two factors result in an average utilization efficiency of 58%. Therefore, the value stored in columns S and T for circuit switched applications is 0.58. In order to calculate the Erlang efficiency of voice calls, the whole air link capacity available for a voice call from the perspective of call admission control is considered. This means that voice calls get a priority over data calls in call admission.

The process to this point has primarily considered only the pay-load on the air interface, but the framing overhead at the air interface and the physical layer are also considered in step 210. For the sake of simplicity, and backward compatibility, these values for circuit switched voice have been lumped into the voice activity factor. For data applications, these value are calculated for different data rates. Columns U and V incorporate this framing overhead at the physical layer in the forward and the reverse links. It is interesting to note that the framing overhead goes down as the data rate goes up. This is due to the fact that more bits are packed into the same 20 msec frame for higher data rates, while the CRC and the tail bits remain constant. Similar overheads apply due to MAC layer overhead in RLP/MUX-PDU/LTU frames as well as the RLP retransmission overhead. MAC layer overheads are shown in columns W and X. The RLP retransmission overheads are shown in the columns Y & Z.

In step 212, the normalized busy hour traffic per subscriber (normalized traffic) is determined. The normalized traffic, therefore, is the Raw Data Bits. Columns AA and AB store the normalized traffic considering the impact of the overheads form the previous step. The Raw Data Bits for various circuit switched and packet data applications are normalized so that now they are identical in terms of air interface capacity. Thus, they can be summed in algebraic fashion. In step 214, the total busy hour traffic per subscriber (total Raw Data Bits) is calculated as a simple addition of the values stored in columns AA and AB for each application. Next, in step 216, the total sector capacity in terms of the number of subscribers per sector is determined by dividing traffic per subscriber by the total sector capacity.

Table 3 summarizes the sector capacity for voice throughput, effective throughput for packet data users, and packet data raw throughput, respectively. Table 3 is based on information derived from Vanghi, e.g., the values are determined for a 60° antenna, NoW=−105 dBm, Voice $E_b/I_o=6$ dB, and packet data $E_b/I_o=4.7$ dB.

TABLE 3

| channel model | Voice through-put *[Kbps] | Packet data throughput [Kbps] @ 9.6 Kbps/user (74% utilization) | Packet data throughput [Kbps] @ 19.2% Kbps/user (71% utilization) | Packet data throughput [Kbps] @ 38.4% Kbps/user (68% utilization) | Packet data throughput [Kbps] @ 76.8% Kbps/user (65% utilization) | Packet data throughput [Kbps] @ 153.6% Kbps/user (62% utilization) | Packet data raw throughput [Kbps] @ 100% utilization) |
|---|---|---|---|---|---|---|---|
| suburban area | 189 | 250 | 240 | 230 | 220 | 210 | 338 |
| urban area | 156 | 195 | 186 | 179 | 171 | 163 | 263 |

For voice throughput, the efficiency factor is very low because of two factors already mentioned: First, circuit switched voice has an Erlang B factor for a GOS of 2% that results in inefficiency; and Second, the higher Eb/Io requirement compared to data has another correction of 1.3 dB or 65%. The throughputs in table 3 are used to calculate the sector capacity in step 216. The sector capacity for urban and suburban environments are calculated separately. Thus, given the sector capacity in Kbps and the Raw Data Bits per user in the busy hour, sector capacity is calculated in terms of the number of users supported per sector per frequency assignment.

This is a simple approach, but helps tremendously in understanding and evaluating the paradigm change from circuit switched to packet switched applications. Current embodiments do not implement subscriber traffic classes per QoS required, e.g., interactive, background, conversational and streaming, and instead use a single scheduler operating on the best effort principle, with a delay constraint of 5 seconds. But a provision is made for future changes in traffic classes with guaranteed QoS that will result in increased efficiency when multiple classes of traffic are introduced. Several of the values used in table 1 and in the underlying assumptions for the model are derived from George Bertini, Subscriber Traffic Model for CDMA2000 1×RTT, EWU/UT 1551-3/FCP101 0746, which is incorporated herein by reference in its entirety.

The model embodied in table 1 is easily turned into a spreadsheet that is used in a tool for determining the capacity of wireless communication systems like system 100. As was illustrated, this capacity analysis can also be done on a sector by sector basis. The results of the capacity analysis can then be used to dimension the system to ensure adequate capacity is available for all subscribers.

While embodiments and implementations of the invention have been shown and described, it should be apparent that many more embodiments and implementations are within the scope of the invention. Accordingly, the invention is not to be restricted, except in light of the claims and their equivalents.

TABLE 1

| Bearer Service (Application mode) A CS/PS (Application mode) | Percent subscribing to bearer service B (%) | Percent of B using Application Mode C (%) | Sessions (Calls) per day D | Session (Call) Duration E (secs) | Usage Scaling Factor F (%) | Busy Hour Factor G % | Percent of Total subscribers using call type (F*C*B) H % | Average BHCA/SA per subscriber (H*D*G) AVERAGE SUBSCRIBER PROFILE I BHCA/BHSA |
|---|---|---|---|---|---|---|---|---|
| PS Data (Web App w/ images ON) | 80% | 20% | 3 | 250 | 50% | 20% | 8.000% | 0.048 |
| PS Data (Web App w/ images OFF) | 80% | 10% | 3 | 250 | 50% | 20% | 4.000% | 0.024 |
| PS Data (WEB App minibrowser) | 80% | 70% | 3 | 250 | 50% | 20% | 28.000% | 0.168 |
| PS Data (Email laptop Fetch with attachment) | 80% | 30% | 5 | 60 | 50% | 20% | 12.000% | 0.12 |
| PS Data (Email laptop Fetch w/o attachment) | 80% | 30% | 5 | 60 | 50% | 20% | 12.000% | 0.12 |
| PS Data (Email laptop, Send with attachment) | 80% | 30% | 1.5 | 60 | 50% | 20% | 12.000% | 0.036 |
| PS Data (Email laptop, Send (without attachment) | 80% | 30% | 1.5 | 6 | 50% | 20% | 12.000% | 0.036 |
| PS Data (Email minibrowser, Fetch (with attachment)) | 80% | 70% | 5 | 60 | 50% | 20% | 28.000% | 0.28 |
| PS Data (Email minibrowser,Fetch (w/o attachment)) | 80% | 70% | 5 | 60 | 50% | 20% | 28.000% | 0.28 |
| PS Data (Email minibrowser, Send (with attachment)) | 80% | 70% | 2 | 5 | 50% | 20% | 28.000% | 0.112 |
| PS Data (Email minibrowser, Send (w/o attachment)) | 80% | 70% | 1 | 1 | 50% | 20% | 28.000% | 0.056 |
| PS Data (Point of Sale) | 80% | 4% | 120 | 10 | 50% | 20% | 1.600% | 0.384 |
| PS Data (Push (type 1)) | 80% | 5% | 10 | 5 | 50% | 20% | 2.000% | 0.04 |
| PS Data (Push (type 2)) | 80% | 5% | 30 | 1 | 50% | 20% | 2.000% | 0.12 |
| PS Data (Puah (type 3)) | 80% | 5% | 2 | 120 | 50% | 20% | 2.000% | 0.008 |
| PS Data (Localization (Pull)) | 80% | 1% | 1440 | 1 | 50% | 20% | 0.400% | 1.152 |
| PS Data (Telemetry (Pull)) | 80% | 1% | 24 | 1 | 50% | 20% | 0.400% | 0.0192 |
| PS Data (Other non realtime (Pull)) | 80% | 3% | 1 | 600 | 50% | 20% | 1.200% | 0.0024 |
| PS Data (Packet Video(Multimedia)) | 80% | 1% | 3.75 | 300 | 50% | 20% | 0.320% | 0.0024 |
| PS Data (VoIP (Voice)) | 80% | 4% | 4 | 80.625 | 50% | 20% | 1.600% | 0.0128 |
| PS Data (Other realtime (Multimedia)) | 80% | 4% | 1 | 300 | 50% | 20% | 1.600% | 0.0032 |
| CS Data (Long Multi-Media) | 0% | 0% | 1 | 1800 | 0% | 20% | 0.000% | 0 |

TABLE 1-continued

| Bearer Service | | | | | | | | |
|---|---|---|---|---|---|---|---|---|
| CS Data (Short Multi-Media) | 25% | 6% | 5 | 300 | 100% | 20% | 1.500% | 0.015 |
| CS Data (Other Data Calls (Muultimedia)) | 25% | 3% | 5 | 300 | 100% | 20% | 0.750% | 0.0075 |
| CS Voice (9.6 K) | 100% | 100% | 4.5 | 90 | 100% | 20% | 100.000% | 0.9 |
| CS Voice (14.4 K) | 100% | 0% | 4.5 | 90 | 100% | 20% | 0.000% | 0 |

| Bearer Service (Application mode) A CS/PS (Application mode) | Number of packet calls per session J | Number of datagrams within a request | | Average Size of the Datagrams | | Average busy Hour Traffic per Sub | | Peak Data Rate (Avg in case of CS Voice) | | Schedular efficiency factor | |
|---|---|---|---|---|---|---|---|---|---|---|---|
| | | FWD K Bytes | REV L Bytes | FWD M Bytes | REV N Bytes | FWD O kbytes/ BH/user | REV P kbytes/ BH/user | FWD Q kbps | REV R kbps | FWD S | REV T |
| PS Data (Web App w/ images ON) | 10 | 60 | 30 | 650 | 65 | 18.72 | .936 | 38.4 | 38.4 | 0.728088646 | 0.665505021 |
| PS Data (Web App w/ images OFF) | 10 | 30 | 15 | 650 | 65 | 4.92 | 0.474 | 38.4 | 38.4 | 0.695149896 | 0.663858083 |
| PS Data (WEB App minibrowser) | 10 | 6 | 3 | 150 | 65 | 3.192 | 2.0076 | 38.4 | 38.4 | 0.663731396 | 0.662540533 |
| PS Data (Email laptop Fetch with attachment) | 1 | 630 | 315 | 325 | 65 | 24.69 | 2.577 | 76.8 | 38.4 | 0.734097504 | 0.676498681 |
| PS Data (Email laptop Fetch w/o attachment) | 1 | 15 | 8 | 325 | 65 | 0.705 | 0.1824 | 38.4 | 38.4 | 0.665519097 | 0.662453964 |
| PS Data (Email laptop, Send with attachment) | 1 | 315 | 630 | 65 | 325 | 0.7731 | 7.407 | 38.4 | 76.8 | 0.676498681 | 0.734097504 |
| PS Data (Email laptop, Send (without attachment) | 1 | 8 | 15 | 65 | 325 | 0.05472 | 0.2115 | 38.4 | 38.4 | 0.666539635 | 0.697190972 |
| PS Data (Email minibrowser, Fetch (with attachment)) | 1 | 135 | 70 | 150 | 65 | 5.95 | 1.554 | 38.4 | 38.4 | 0.676340321 | 0.665290356 |
| PS Data (Email minibrowser, Fetch (w/o attachment)) | 1 | 4 | 2 | 150 | 65 | 0.448 | 0.3164 | 38.4 | 38.4 | 0.662510269 | 0.662179474 |
| PS Data (Email minibrowser, Send (with attachment)) | 1 | 70 | 135 | 65 | 150 | 0.6216 | 2.38 | 38.4 | 38.4 | 0.701484271 | 0.834083854 |
| PS Data (Email minibrowser, Send (w/o attachment)) | 1 | 2 | 4 | 65 | 150 | 0.06328 | 0.0896 | 38.4 | 38.4 | 0.672768438 | 0.692616146 |
| PS Data (Point of Sale) | 1 | 5 | 5 | 230 | 230 | 0.8256 | 0.8256 | 38.4 | 38.4 | 0.667384219 | 0.667384219 |
| PS Data (Push (type 1)) | 1 | 20 | 20 | 500 | 65 | 0.44 | 0.092 | 38.4 | 38.4 | 0.747514063 | 0.674035313 |
| PS Data (Push (type 2)) | 1 | 1 | 1 | 100 | 65 | 0.132 | 0.1278 | 38.4 | 38.4 | 0.671501563 | 0.670023542 |
| PS Data (Push (type 3)) | 1 | 400 | 400 | 500 | 65 | 1.608 | 0.216 | 38.4 | 38.4 | 0.732425933 | 0.671193641 |
| PS Data (Localization (Pull)) | 1 | 0 | 1 | 0 | 30 | 1.152 | 1.18656 | 38.4 | 38.4 | 0.667278646 | 0.668545521 |
| PS Data (Telemetry (Pull)) | 1 | 0 | 1 | 0 | 100 | 0.0192 | 0.02112 | 38.4 | 38.4 | 0.667278646 | 0.671501563 |
| PS Data (Other non realtime (Pull)) | 1 | 3500 | 17 | 550 | 60 | 4.6224 | 0.004848 | 38.4 | 38.4 | 0.797494041 | 0.662080587 |
| PS Data (Packet Video(Multimedia)) | 1 | 60000 | 60000 | 60 | 60 | 8.6424 | 8.6424 | 153.6 | 153.6 | 0.788691899 | 0.788691899 |
| PS Data (VoIP (Voice)) | 1 | 1066 | 1066 | 60 | 60 | 0.831488 | 0.831488 | 38.4 | 38.4 | 0.695565968 | 0.695565968 |
| PS Data (Other realtime (Multimedia)) | 1 | 80000 | 17 | 60 | 60 | 15.3632 | 0.006464 | 153.6 | 153.6 | 0.830921066 | 0.662040294 |
| CS Data (Long Multi-Media) | 1 | | | | | 0.00 | 0.00 | | | | |
| CS Data (Short Multi-Media) | 1 | | | | | 8.10 | 8.10 | 14.40 | 14.40 | 0.58 | 0.58 |
| CS Data (Other Data Calls (Muultimedia)) | 1 | | | | | 4.05 | 4.05 | 14.40 | 14.40 | 0.58 | 0.58 |
| CS Voice (9.6 K) | 1 | | | | | 43.74 | 43.74 | 9.60 | 9.60 | 0.58 | 0.58 |
| CS Voice (14.4 K) | 1 | | | | | 0.00 | 0.00 | 14.40 | 14.40 | 0.58 | 0.58 |

| Bearer Service (Applicaton mode) A | Air Interface Framing Overhead Correcton [eg. for fwd link 1-(24*50/(Q5*1000))] | | MAC Layer Framing Overhead Correcton Factor (1-MAC Overhead) | | RLP Retrans- mission Overhead [1-(FER*19.2/Q)] | | Normalized Traffic per subscriber in Busy Hour [e.g. for fwd link O5/(S5*U5*W5*Y5)] RAW DATA BITS | |
|---|---|---|---|---|---|---|---|---|
| | FWD U | REV V | FWD W | REV X | FWD Y | REV Z | FWD AA kbytes/ | REV AB kbytes/ |

TABLE 1-continued

| CS/PS (Application mode) | | | | | | | BH/user | BH/user |
|---|---|---|---|---|---|---|---|---|
| PS Data (Web App w/images ON) | 0.96875 | 0.96875 | 0.875 | 0.875 | 0.975 | 0.975 | 31.9074859 | 2.57446821 |
| PS Data (Web App w/images OFF) | 0.96875 | 0.96875 | 0.875 | 0.875 | 0.975 | 0.975 | 8.563716005 | 0.86393031 |
| PS Data (WEB App minibrowser) | 0.96875 | 0.96875 | 0.875 | 0.875 | 0.975 | 0.975 | 5.818970256 | 3.66640427 |
| PS Data (Email laptop Fetch with attachment) | 0.984375 | 0.96875 | 0.875 | 0.875 | 0.9875 | 0.975 | 39.54227112 | 4.60917376 |
| PS Data (Email laptop Fetch w/o attachment) | 0.96875 | 0.96875 | 0.875 | 0.875 | 0.975 | 0.975 | 1.28175261 | 0.33315378 |
| PS Data (Email laptop, Send with attachment) | 0.96875 | 0.984375 | 0.875 | 0.875 | 0.975 | 0.9875 | 1.382752127 | 11.8626813 |
| PS Data (Email laptop, Send (without attachment) | 0.96875 | 0.96875 | 0.875 | 0.875 | 0.975 | 0.975 | 0.099333497 | 0.36705761 |
| PS Data (Email minibrowser, Fetch (with attachment)) | 0.96875 | 0.96875 | 0.875 | 0.875 | 0.975 | 0.975 | 10.6445499 | 2.82628141 |
| PS Data (Email minibrowser, Fetch (w/o attachment)) | 0.96875 | 0.96875 | 0.875 | 0.875 | 0.975 | 0.975 | 0.818202902 | 0.57814447 |
| PS Data (Email minibrowser, Send (with attachment)) | 0.96875 | 0.96875 | 0.875 | 0.875 | 0.975 | 0.975 | 1.072182425 | 3.45257291 |
| PS Data (Email minibrowser, Send (w/o attachment)) | 0.96875 | 0.96875 | 0.875 | 0.875 | 0.975 | 0.975 | 0.113808966 | 0.15652763 |
| PS Data (Point of Sale) | 0.96875 | 0.96875 | 0.875 | 0.875 | 0.975 | 0.975 | 1.496819275 | 1.49681928 |
| PS Data (Push (type 1)) | 0.96875 | 0.96875 | 0.875 | 0.875 | 0.975 | 0.975 | 0.712211407 | 0.16515084 |
| PS Data (Push (type 2)) | 0.96875 | 0.96875 | 0.875 | 0.875 | 0.975 | 0.975 | 0.237849651 | 0.23078969 |
| PS Data (Push (type 3)) | 0.96875 | 0.96875 | 0.875 | 0.875 | 0.975 | 0.975 | 2.656427375 | 0.38938708 |
| PS Data (Localization (Pull)) | 0.96875 | 0.96875 | 0.875 | 0.875 | 0.975 | 0.975 | 2.088915479 | 2.14750575 |
| PS Data (Telemetry (Pull)) | 0.96875 | 0.96875 | 0.875 | 0.875 | 0.975 | 0.975 | 0.034815258 | 0.03805594 |
| PS Data (Other non realtime (Pull)) | 0.96875 | 0.96875 | 0.875 | 0.875 | 0.975 | 0.975 | 7.013191435 | 0.00885987 |
| PS Data (Packet Video (Multimedia)) | 0.9921875 | 0.9921875 | 0.875 | 0.875 | 0.99375 | 0.99375 | 12.701296 | 12.701296 |
| PS Data (VoIP (Voice)) | 0.96875 | 0.96875 | 0.875 | 0.875 | 0.975 | 0.975 | 1.446416198 | 1.4464162 |
| PS Data (Other realtime (Multimedia)) | 0.9921875 | 0.9921875 | 0.875 | 0.875 | 0.99375 | 0.99375 | 21.43102628 | 0.01131717 |
| CS Data (Long Multi-Media) | | | | | | | | |
| CS Data (Short Multi-Media) | 0.91666667 | 0.91666667 | 0.875 | 0.875 | 0.93333333 | 0.93333333 | 18.65523639 | 18.6552364 |
| CS Data (Other Data Calls (Muultimedia)) | 0.91666667 | 0.91666667 | 0.875 | 0.875 | 0.93333333 | 0.93333333 | 9.327618195 | 9.32761819 |
| CS Voice (9.6 K) | 1 | 1 | 1 | 1 | 1 | 1 | 75.41 | 75.41 |
| CS Voice (14.4 K) | 1 | 1 | 1 | 1 | 1 | 1 | 0.00 | 0.00 |

What is claimed:

1. A method of dimensioning a wireless communication system configured to support a plurality of applications, comprising:

for each application, estimating a percentage of subscribers of the wireless communication system that will use the application;

for each application, determining a subscriber profile for the application based at least in part on the estimated percentage of subscribers that will use the application;

for each application, determining a busy hour traffic per subscriber ratio for the application based at least in part on the subscriber profile for the application; and using the busy hour traffic per subscriber ratios to determine a number of subscribers the wireless communication system will support.

2. The method of claim 1, wherein using the busy hour traffic per subscriber ratios to determine a number of subscribers the wireless communication system will support comprises:

determining a total busy hour traffic per subscriber ratio from the busy hour traffic per subscriber ratios;

estimating a total traffic capacity; and determining the number of subscribers the wireless communication system will support by dividing the estimated total traffic capacity by the determined total busy hour traffic per subscriber ratio.

3. The method of claim 2, wherein the total busy hour traffic per subscriber ratio is determined for both a forward link and a reverse link in the wireless communication system.

4. The method of claim 2, further comprising: for each application, estimating a scheduler efficiency factor; and for each application, normalizing the busy hour traffic per subscriber ratio based at least in part on the estimated scheduler efficiency factor to determine a required Raw Data Bits.

5. The method of claim 4, wherein determining the total busy hour traffic per subscriber ratio for the wireless communication system comprises summing the required Raw Data Bits for each application.

6. The method of claim 5, wherein normalization of the busy hour traffic per subscriber ratios for each application is further based on at least one of the following: air interface framing overhead, MAC layer framing overhead; and RLP retransmission overhead.

7. The method of claim 5, wherein the busy hour traffic per subscriber ratios, required Raw Data Bits, and the total busy hour traffic per subscriber ratio are each measured in kilobytes per hour per subscriber, and wherein the total traffic capacity is measured in kilobytes per hour.

8. The method of claim 1, wherein estimating the percentage of subscribers of the wireless communication system that will use a given application is estimated by: estimating or measuring a first percentage, the first percentage being the percentage of subscribers of the wireless communication system that subscribe to a bearer service that supports the application; estimating or measuring a second percentage, the second percentage being the percentage of subscribers that subscribe to the respective bearer service and that will actually use the application; estimating a usage scaling factor; and multiplying the first percentage, the second percentage, and the usage scaling factor.

9. The method of claim 8, wherein determining a subscriber profile for each application comprises: estimating or measuring a number of application sessions that an average subscriber included in the second percentage will engage in per day; estimating or measuring an average duration of each application session; determining a busy hour factor based on the measured or estimated number of application sessions and the measured or estimated average duration of each application session; and multiplying the determined busy hour factor by the second percentage to determine the subscriber profile for the application.

10. The method of claim 9, wherein determining a subscriber profile for a given application further comprises: averaging the determined subscriber profile over the total number of subscribers of the wireless communication system to derive an average subscriber profile for the application.

11. The method of claim 9, wherein determining the busy hour traffic per subscriber ratio for a given application comprises: estimating or measuring a number of bytes per application session; and multiplying the estimated or measured number of bytes per application session by the determined subscriber profile.

12. The method of claim 1, wherein the plurality of applications includes both circuit switched and packet data applications.

13. The tool of claim 12, wherein all packet data applications are considered interactive classes of traffic and all circuit switched applications are considered conversational classes of traffic.

14. The method of claim 1, wherein the capacity of the wireless communication system is determined on a per sector basis.

15. A computer readable medium having stored thereon one or more sequences of instructions for causing one or more processors to perform steps for dimensioning a wireless communication system configured to support a plurality of applications, the steps comprising:

for each application, estimating a percentage of subscribers of the wireless communication system that will use the application;

for each application, determining a subscriber profile for the application based at least in part on the estimated percentage of subscribers that will use the application;

for each application, determining a busy hour traffic per subscriber ratio for the application based at least in part on the subscriber profile for the application;and using the busy hour traffic per subscriber ratios to determine a number of subscribers the wireless communication system will support.

16. The computer readable medium of claim 15, wherein the using step comprises:

determining a total busy hour traffic per subscriber ratio from the busy hour traffic per subscriber ratios estimating a total traffic capacity: and determining the number of subscribers the wireless communication system will support by dividing the estimated total traffic capacity by the determined total busy hour traffic per subscriber ratio.

17. The computer readable medium of claim 16, wherein the steps further comprise: for each application, estimating a scheduler efficiency factor; and for each application, normalizing the busy hour traffic per subscriber ratio based at least in part on the estimated scheduler efficiency factor to determine a required Raw Data Bits.

18. The computer readable medium of claim 17, wherein determining the total busy hour traffic per subscriber ratio for the wireless communication system comprises summing the required Raw Data Bits for each application.

19. A system configured to dimension a wireless communication system configured to support a plurality of applications, the system comprising:

a processor;

a data storage area; and an execution area configured to:

for each application, estimate a percentage of subscribers of the wireless communication system that will use the application:

for each application, determine a subscriber profile for the application based at least in part on the estimated percentage of subscribers that will use the application;

for each application, determine a busy hour traffic per subscriber ratio for the application based at least in part on the subscriber profile for the application; and using the busy hour traffic per subscriber ratios to determine a number of subscribers the wireless communication system will support.

20. The system of claim 19, wherein the execution area uses the busy hour traffic per subscriber ratios to determine the number of subscribers the wireless communication system will support by:

determining a total busy hour traffic per subscriber ratio from the busy hour traffic per subscriber ratios determined for each application;

estimating a total traffic capacity; and determining the number of subscribers the wireless communication system will support by dividing the estimated total traffic capacity by the determined total busy hour traffic per subscriber ratio.

21. The system of claim 20, wherein the execution area is further configured to: for each application, estimate a scheduler efficiency factor; and for each application, normalize the busy hour traffic per subscriber ratio based at least in part on the estimated scheduler efficiency factor to determine a required Raw Data Bits.

22. The method of claim 21, wherein determining the total busy hour traffic per subscriber ratio for the wireless communication system comprises summing the required Raw Data Bits for each application.

* * * * *

UNITED STATES PATENT AND TRADEMARK OFFICE
CERTIFICATE OF CORRECTION

PATENT NO.     : 6,801,776 B2
DATED          : October 5, 2004
INVENTOR(S)    : Notanii et al.

It is certified that error appears in the above-identified patent and that said Letters Patent is hereby corrected as shown below:

Title page,
Item [75], Inventors, change "Notanii" to -- Notani --.

Signed and Sealed this

Fourth Day of January, 2005

JON W. DUDAS
*Director of the United States Patent and Trademark Office*